(12) United States Patent
Fu et al.

(10) Patent No.: US 12,247,824 B1
(45) Date of Patent: Mar. 11, 2025

(54) HETERODYNE INTERFEROMETER BASED ON MULTI-TARGET OPPOSITE DISPLACEMENT MEASUREMENT AND MEASUREMENT METHOD THEREOF

(71) Applicant: HARBIN INSTITUTE OF TECHNOLOGY, Harbin (CN)

(72) Inventors: Haijin Fu, Harbin (CN); Xiaobo Su, Harbin (CN); Liang Yu, Harbin (CN); Pengcheng Hu, Harbin (CN); Zhaochen Pan, Harbin (CN); Zhiwei Wang, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 18/595,312

(22) Filed: Mar. 4, 2024

(30) Foreign Application Priority Data

Nov. 17, 2023 (CN) .......................... 202311538447.X

(51) Int. Cl.
*G01B 11/14* (2006.01)
*G01B 9/02002* (2022.01)

(52) U.S. Cl.
CPC .......... *G01B 11/14* (2013.01); *G01B 9/02002* (2013.01)

(58) Field of Classification Search
CPC .......................... G01B 11/14; G01B 9/022002
USPC .......................................................... 356/486
See application file for complete search history.

(56) References Cited

U.S. PATENT DOCUMENTS

| | | | |
|---|---|---|---|
| 9,879,979 B2* | 1/2018 | Zhang | G01B 9/02007 |
| 2003/0048441 A1 | 3/2003 | Manning | |
| 2010/0268499 A1* | 10/2010 | Holzapfel | G01B 9/0207 |
| | | | 356/454 |
| 2020/0386533 A1 | 12/2020 | Hu et al. | |

FOREIGN PATENT DOCUMENTS

| | | |
|---|---|---|
| CN | 103983206 A | 8/2014 |
| CN | 111442715 A | 7/2020 |
| CN | 111742190 A | 10/2020 |
| CN | 112484648 A | 3/2021 |
| CN | 116428966 A | 7/2023 |

(Continued)

OTHER PUBLICATIONS

First Examination Report and Search Report of CNIPA.
Notice of Allowance from CNIPA and Allowed Claims.

*Primary Examiner* — Sunghee Y Gray

(57) ABSTRACT

A heterodyne interferometer and a measurement method based on multi-target opposite displacement measurement are provided, technical points including: An output path of the laser source is sequentially arranged with a first beam splitter and a second beam splitter arranged in parallel on left and right sides, and both of which are polarization beam splitters; a first reflector is arranged above the first beam splitter, a third reflector is arranged on a right side of the second beam splitter, a second plane reflector is arranged in front of the second beam splitter, and a first plane reflector is arranged behind the second beam splitter; the first plane reflector and the second plane reflector jointly constitute a second reflector group; a left side of the first beam splitter is provided with a first photodetector and a second photodetector. The present invention realizes the measurement of relative displacement between opposing objects.

5 Claims, 4 Drawing Sheets

(56) References Cited

FOREIGN PATENT DOCUMENTS

| | | | |
|---|---|---|---|
| CN | 117031769 | A | 11/2023 |
| KR | 20200125149 | A | 11/2020 |
| WO | 2013013346 | A1 | 1/2013 |

\* cited by examiner

HETERODYNE INTERFEROMETER BASED ON MULTI-TARGET OPPOSITE DISPLACEMENT MEASUREMENT AND MEASUREMENT METHOD THEREOF

CROSS-REFERENCE

This application claims to the benefit of priority from Chinese Application No. 202311538447.X with a filing date of Nov. 17, 2023 The content of the aforementioned applications, including any intervening amendments thereto, are incorporated herein by reference.

TECHNICAL FIELD

The present invention relates to a heterodyne laser interferometer and a measurement method, in particular to a heterodyne interferometer based on multi-target opposite displacement measurement and a measurement method thereof, relating to the field of laser application technology.

BACKGROUND

Heterodyne laser interferometry technology has the advantages in large range, high resolution, high signal-to-noise ratio, and good traceability of measurement results. It is widely used in precision engineering fields such as high-end equipment manufacturing, precision metrology; and large-scale scientific facilities, becoming one of the indispensable core common basic technologies in precision engineering.

In heterodyne laser interferometry, nanoscale periodic or nonlinear errors caused by frequency aliasing, polarization mixing, and ghost reflection limit the precision of known interferometers. Scholars from various countries have proposed heterodyne laser interferometry techniques based on spatial separation optical paths, which weaken or eliminate optical mixing through spatial separation between beams to reduce or even eliminate periodic nonlinear errors. However, the current measurement of heterodyne interferometers mainly focuses on the relative displacement of a single target mirror relative to a certain fixed reference mirror inside the mirror group. No relevant solution has been proposed for relative displacement measurement with opposite moving targets.

The heterodyne laser interferometer designed by Chinese scholars Wu Chien-ming et al. (*Heterodyne Interferometer with Subatomic Periodic Nonlinearity*. Appl. Opt., 1999, 38 (19): 4089-4094) is extremely complex in composition and difficult to assemble. Moreover, it is a displacement measurement of a single target relative to the mirror group itself, and its optical structure cannot meet the demands of relative displacement measurement between opposite moving targets.

Korean scholars Ki-Nam Joo et al. developed a novel spatially separated heterodyne laser interferometer in application WO2010030179A1, which has a complex structure and does not meet the requirements for measuring relative displacement between two objects in the opposite direction.

In an article published by TL Schmitz and JF Beckwith in Journal of Modern Optics 49, pages 2105-2114, titled "*Acousto optical displacement measurement interferometer: a new heterodyne interferometer with an astrom level periodic error*", it is recommended to provide known a heterodyne laser interferometer with acousto-optic modulators as a beam splitter. However, the diffraction angle of the acousto-optic modulator is very small, and due to manufacturing defects, the acousto-optic modulator is likely to have frequency mixing. Its specific configuration limits the applications commonly used for measuring displacement. This device corresponds to a device known from USB6,847,455. And it still cannot meet the requirements of the relative displacement measurement between two objects in the opposite direction.

Scholars Shuko Yokoyama et al. from Advanced Industrial Science and Technology and the National Research Laboratory of Metrology in Japan, proposed a heterodyne interferometer with periodic nonlinear errors at the deep sub-nanometer level (*A heterodyne interferometer constructed in an integrated optics and its metrological evaluation of a picometre order periodic error* [J]. Precision Engineering, 2018, 54:206-211.). However, the optical structure of the interferometer is exceptionally complex, with multiple special processing surfaces, but the moving target mirror and reference mirror are in the same direction, which does not meet the requirements for relative displacement measurement of the opposing target.

In recent years, Chinese scholars such as Hu Pengcheng have introduced a spatially separated heterodyne laser interferometer in patent CN111442715B, which significantly reduces periodic nonlinear errors and has excellent thermal stability. However, as a single target displacement measurement, it cannot meet the requirements for relative displacement measurement between opposite moving targets.

In summary, although the existing spatially separated heterodyne laser interferometer currently suppress the nanoscale periodic nonlinear error to 1 nanometer, it does not meet the requirements for relative displacement measurement between opposite moving targets.

SUMMARY

In order to overcome the problem that the existing spatial separated heterodyne laser interferometer does not meet the requirements for relative displacement measurement between opposite moving targets, the present invention provides a heterodyne interferometer based on multi-target opposite displacement measurement and a measurement method thereof. A brief overview of the present invention is provided below to provide a basic understanding of certain aspects of the present invention. It should be understood that this overview is not an exhaustive overview of the present invention. It is not intended to determine the key or important parts of the present invention, nor is it intended to limit the scope of the present invention.

The first technical solution of the present invention:

A heterodyne interferometer based on multi-target opposite displacement measurement, including:

a laser source for providing two spatially separated beams with different frequencies; the two spatially separated beams with different frequencies are defined as a first input beam with frequency $f_1$ and a second input beam with frequency $f_2$, respectively;

an output path of the laser source is sequentially arranged with a first beam splitter and a second beam splitter arranged in parallel on left and right sides, and both of the first beam splitter and the second beam splitter are polarization beam splitters;

the first beam splitter is used to divide at least one beam into a reference beam and a measurement beam;

the second beam splitter is used to achieve that a relative displacement optical path structure of an object opposing the measurement beam, and the splitting direction of the second beam splitter is perpendicular to a splitting direction of the first beam splitter;
a first reflector is arranged above the first beam splitter, a third reflector is arranged on a right side of the second beam splitter, a second plane reflector is arranged in front of the second beam splitter, and a first plane reflector is arranged behind the second beam splitter; the first plane reflector and the second plane reflector jointly constitute a second reflector group; a front end face of the second beam splitter is attached with a second quarter-wave plate, and a rear end face is attached with a first quarter-wave plate;
the first reflector and the second reflector group are used for reflecting the reference beam and the measurement beam;
the third reflector is used to achieve optical path layering;
a left side of the first beam splitter is provided with a first photodetector and a second photodetector;
the first photodetector and the second photodetector are used to detect interference signals related to the reference beam and the measurement beam after reflection.

Further, the first reflector and the third reflector are retroreflector.

Further, a spatial position status of the first beam splitter and the second beam splitter satisfy that directions of reflected beams of the first beam splitter and the second beam splitter are perpendicular to each other.

Further, a motion direction of the second reflector group is perpendicular to the direction of an incident light of the second reflector group.

Further, the first plane reflector and the second plane reflector are both composed of a single moving large plane reflector, or both are composed of a plurality of moving small plane reflectors.

The second technical solution of the present invention:

A measurement method for a heterodyne interferometer based on multi-target opposite displacement measurement is provided, wherein the heterodyne interferometer is the heterodyne interferometer based on multi-target opposite displacement measurement as mentioned in the first technical solution;

the measurement method includes the following steps:
after the first input beam is incident on the first beam splitter, a transmitted beam of the first input beam forms a first measurement beam, and a reflected beam of the first input beam forms a first reference beam;
after the second input beam is incident on the first beam splitter, a transmitted beam of the second input beam forms a second measurement beam, and a reflected beam of the second input beam forms a second reference beam;
the first measurement beam and the second measurement beam continue to pass through the second beam splitter and are reflected on a beam splitter surface of the second beam splitter, then reflected twice on each mirror surface of the second reflector group under a combined action of the first quarter-wave plate, the second quarter-wave plate, and the third reflector, and then carry double of Doppler frequency shifts and transmit an output through the first beam splitter;
at the same time, the first reference beam and the second reference beam are reflected and output by the first beam splitter under an action of the first reflector, with beam frequencies unchanged; at least a portion of the output first measurement beam and the output second reference beam recombine to form a first interference signal in an output travel path, and at least a portion of the first reference beam and the second measurement beam recombine to form a second interference signal in the output travel path;
finally; the first photodetector receives the first interference signal, the second photodetector receives the second interference signal, and position change information of a target plane reflector at different degrees of freedom is obtained after conducting signal processing on the first interference signal and the second interference signal.

Further, adjusting a position of the third reflector and an angle of the second reflector group so that the first measurement beam and the second reference beam share at least a part of travel path after reflection, and the second measurement beam and the first reference beam share at least a part of the travel path after reflection, and shared path beams are in parallel.

The advantageous effects of the present invention are reflected in:

(1) In the present invention, the layout of two beam splitters with perpendicular splitting directions changes the direction of the target reflector relative to the incident beam, and can simultaneously consider the relative motion between multiple targets, breaking through the measurement mode of the relative displacement direction of a single target in a conventional mirror group, and primarily solving the problem of measuring the relative displacement between opposing objects.

(2) The heterodyne laser interferometer of the present invention, compared to other spatially separated heterodyne laser interferometers, simultaneously takes into account the following characteristics: the measurement beam and the reference beam of the heterodyne laser interferometer are separated in space before the final interference, thereby significantly reducing periodic nonlinear errors; at the same time, the measurement beam of the heterodyne laser interferometer is reflected twice by the same target plane reflector, which enhances the spatial adaptability of the interference signal and the resolution ability, improving the practical engineering ability.

(3) In the present invention, the heterodyne laser interferometer has a simple structure, is easy to integrate and assemble, and has good stability during its installation and use. In addition to using spatial light, optical fibers can also be used to import light sources and export interference beams.

Figure 1:
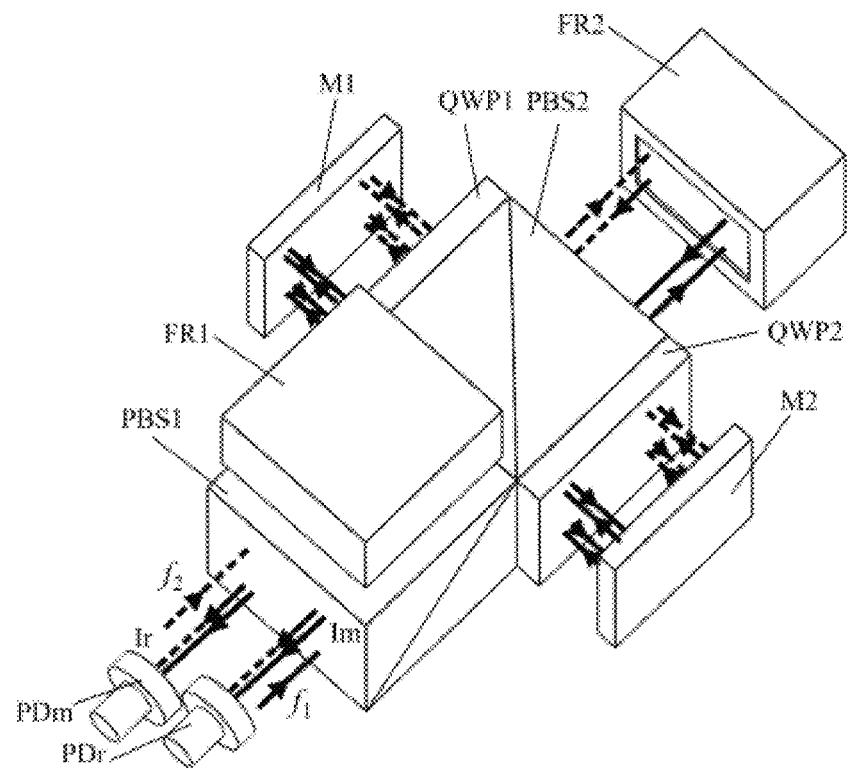
FIG. 1 is a three-dimensional schematic diagram of the structure of a heterodyne interferometer based on multi-target opposite displacement measurement in Embodiment 1.
Figure 2:
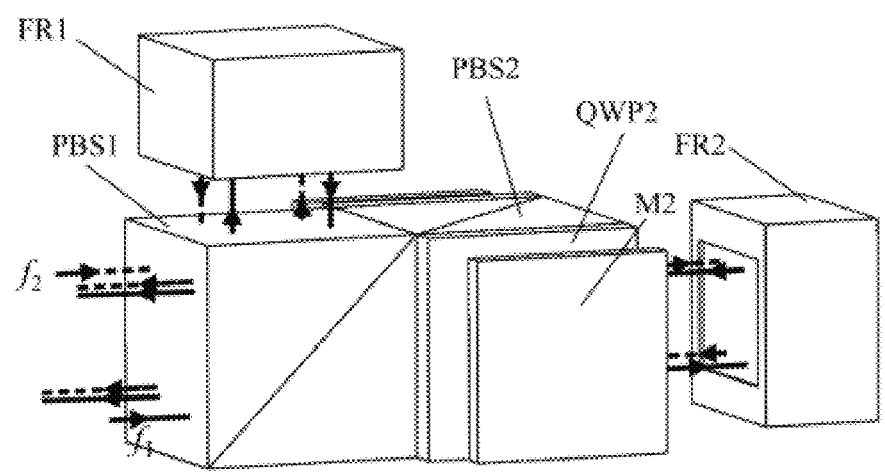
FIG. 2 is a three-dimensional schematic diagram of the structure of the heterodyne interferometer based on multi-target opposite displacement measurement in Embodiment 1 (detector omitted)
Figure 3:
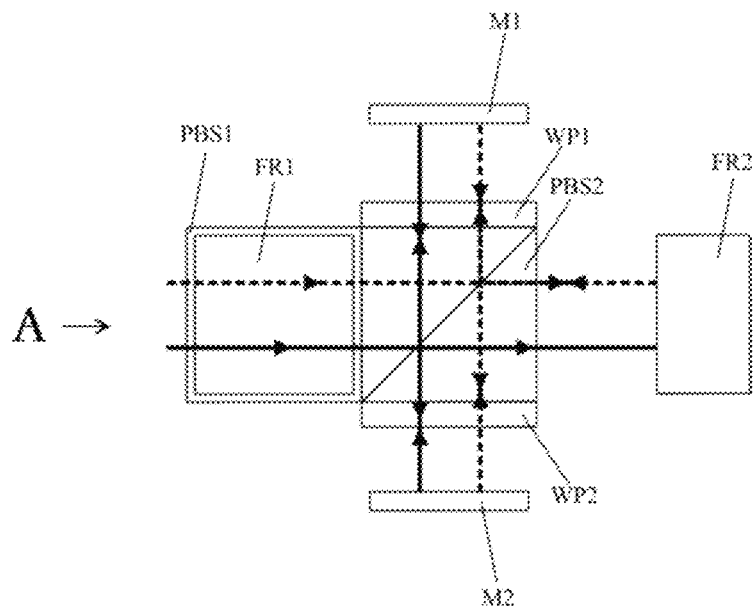
FIG. 3 is a schematic diagram of the optical path of the heterodyne interferometer based on multi-target opposite displacement measurement in Embodiment 1.
Figure 4:
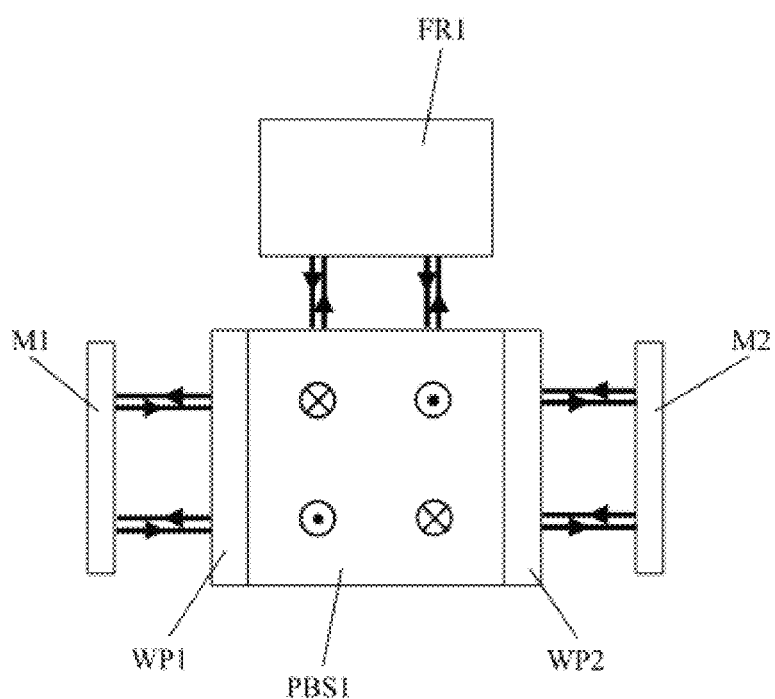
FIG. 4 is the A-direction view of FIG. 3.

Illustration of the reference numbers in the drawings:
FR1: first reflector;
FR2: third reflector;
M1: first plane reflector;
M2: second plane reflector;
PBS1: first beam splitter;
PBS2: second beam splitter;
QWP1: first quarter-wave plate;
QWP2: second quarter-wave plate;
F1: first input beam with a frequency $f_1$;
F2: second input beam with a frequency $f_2$;
Im: first interference signal
Ir: second interference signal
PDm: first photodetector
PDr: second photodetector.

DETAILED DESCRIPTION OF THE EMBODIMENTS

To make the objective, technical solution, and advantages of the present invention clearer, the specific embodiments shown in the accompanying drawings will be used to describe the present invention. However, it should be understood that these descriptions are only illustrative and not intended to limit the scope of the present invention. Furthermore, in the following illustration, the description of the well-known structure and technology has been omitted to avoid unnecessary confusion with the concepts of the present invention. It should also be understood that, unless otherwise specified or pointed out, the terms "first", "second", "third" and other descriptions in the manual are only used to distinguish the various components, elements, steps, etc. in the manual, rather than to represent the logical or sequential relationships between the components, elements, steps, etc.

Embodiment 1, combined with the FIG. 1-FIG. 4 to illustrate the present embodiment, a heterodyne interferometer based on multi-target opposite displacement measurement is provided in the present embodiment, including a laser source for providing two spatially separated beams with different frequencies: the two spatially separated beams with different frequencies are defined as a first input beam with frequency $f_1$ and a second input beam with frequency $f_2$, respectively. An output path of the laser source is sequentially arranged with a first beam splitter PBS1 and a second beam splitter PBS2 arranged in parallel on left and right sides, and both of the first beam splitter PBS1 and the second beam splitter PBS2 are polarization beam splitters. The first beam splitter PBS1 is used to divide at least one beam into a reference beam and a measurement beam, and the second beam splitter PBS2 is used to achieve that a relative displacement optical path structure of an object opposing the measurement beam is perpendicular to a splitting direction of the first beam splitter PBS1. A first reflector FR1 is arranged above the first beam splitter PBS1, a third reflector FR2 is arranged on a right side of the second beam splitter PBS2, a second plane reflector M2 is arranged in front of the second beam splitter PBS2, and a first plane reflector M1 is arranged behind the second beam splitter PBS2. The first plane reflector M1 and the second plane reflector M2 jointly constitute a second reflector group. A front end face of the second beam splitter PBS2 is attached with a second quarter-wave plate QWP2, and a rear end face is attached with a first quarter-wave plate QWP1. The first reflector FR1 and the second reflector group are used for reflecting the reference beam and the measurement beam. The third reflector FR2 is used to achieve optical path layering. The left side of the first beam splitter PBS1 is provided with a first photodetector PDm and a second photodetector PDr, and the first photodetector PDm and the second photodetector PDr are used to detect interference signals related to the reference beam and the measurement beam after reflection. The first reflector FR1 and the third reflector FR2 are retroreflector. A spatial position status of the first beam splitter PBS1 and the second beam splitter PBS2 satisfy that directions of reflected beams of the first beam splitter and the second beam splitter are perpendicular to each other. The motion direction of the second reflector group is perpendicular to the direction of an incident light of the second reflector group. The first plane reflector M1 and the second plane reflector M2 are both composed of a single moving large plane reflector.

Figure 5:
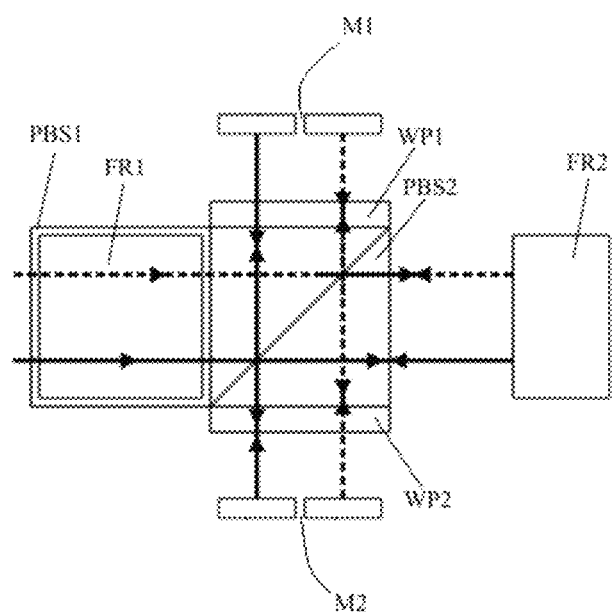
FIG. 5 is a schematic diagram of the optical path of a heterodyne interferometer based on multi-target opposite displacement measurement in Embodiment 2.

Embodiment 2, combined with the FIG. 5 to illustrate the present embodiment, the difference between this embodiment and embodiment 1 is that: the motion direction of the second reflector group is perpendicular to the direction of an incident light of the second reflector group. The first plane reflector M1 and the second plane reflector M2 are both composed of two moving small plane reflectors.

Embodiment 3, combined with the FIG. 1-FIG. 4 to illustrate the present embodiment, a measurement method for a heterodyne interferometer based on multi-target opposite displacement measurement is provided in the present embodiment. The heterodyne laser interferometer is the heterodyne interferometer based on multi-target opposite displacement measurement as described in the Embodiment 1.

The measurement method includes the following steps:

After the first input beam is incident on the first beam splitter PBS1, a transmitted beam of the first input beam forms a first measurement beam, and a reflected beam of the first input beam forms a first reference beam; after the second input beam is incident on the first beam splitter PBS1, a transmitted beam of the second input beam forms a second measurement beam, and a reflected beam of the second input beam forms a second reference beam;

The first measurement beam and the second measurement beam continue to pass through the second beam splitter PBS2 and are reflected on a beam splitter surface of the second beam splitter PBS2, then reflected twice on each mirror surface of the second reflector group under a combined action of the first quarter-wave plate QWP1, the second quarter-wave plate QWP2, and the third reflector FR2, and then carry double of Doppler frequency shifts and transmit an output through the first beam splitter PBS1;

At the same time, the first reference beam and the second reference beam are reflected and output by the first beam splitter PBS1 under an action of the first reflector FR1, with beam frequencies unchanged; at least a portion of the output first measurement beam and the output second reference beam recombine to form a first interference signal Im in an output travel path, and at least a portion of the first reference beam and the second measurement beam recombine to form a second interference signal Ir in the output travel path;

Finally, the first photodetector PDm receives the first interference signal Im, the second photodetector PDr receives the second interference signal Ir, and position change information of a target plane reflector at different degrees of freedom is obtained after conducting signal processing on the first interference signal Im and the second interference signal Ir.

More specifically, adjusting a position of the third reflector and an angle of the second reflector group so that the first measurement beam and the second reference beam share at least a part of travel path after reflection, and the second measurement beam and the first reference beam share at least a part of the travel path after reflection, and the shared path beams are in parallel.

In the above embodiments, the heterodyne laser interferometer has a simple structure, is easy to integrate and assemble, and has good stability during its installation and use. In addition to using spatial light, optical fibers can also be used to import light sources and export interference beams.

The formula for the periodic nonlinear error of a heterodyne interferometer is as follows:

$$NPL = \frac{\lambda}{2\pi N} \cdot \frac{\Gamma_N}{\Gamma_S}$$
$$= \frac{632.8}{2\pi \times 4} \cdot \frac{\Gamma_N}{\Gamma_S} \text{nm}$$

In the formula, $\lambda$ is the wavelength of the laser source, which is 632.8 nm; N is the optical subdivision number, and the optical structure of the interferometer has an optical subdivision number of 4; $\Gamma_N$ is the peak amplitude of a nonlinear signal, and $\Gamma_S$ is the peak amplitude of an interference signal, which are expressed in decibels in a spectrum analyzer.

Figure 6:
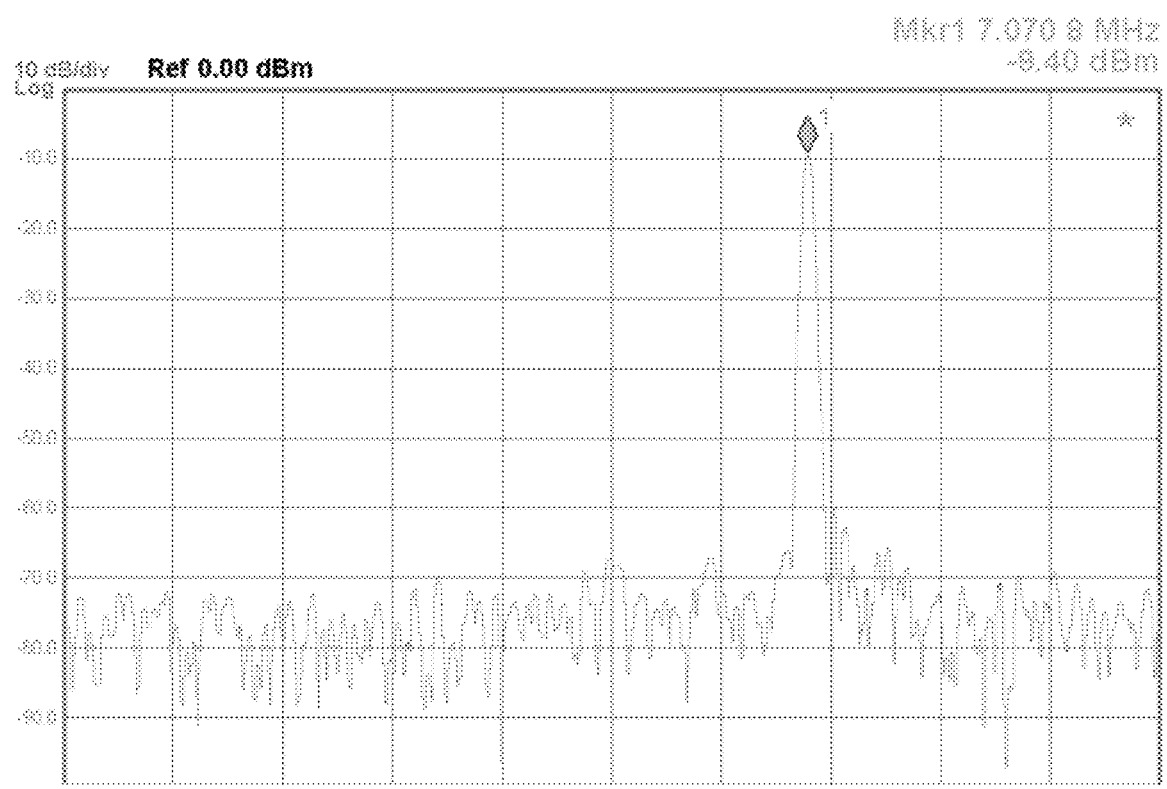
FIG. 6 is an amplitude curve of an interference signal.
Figure 7:
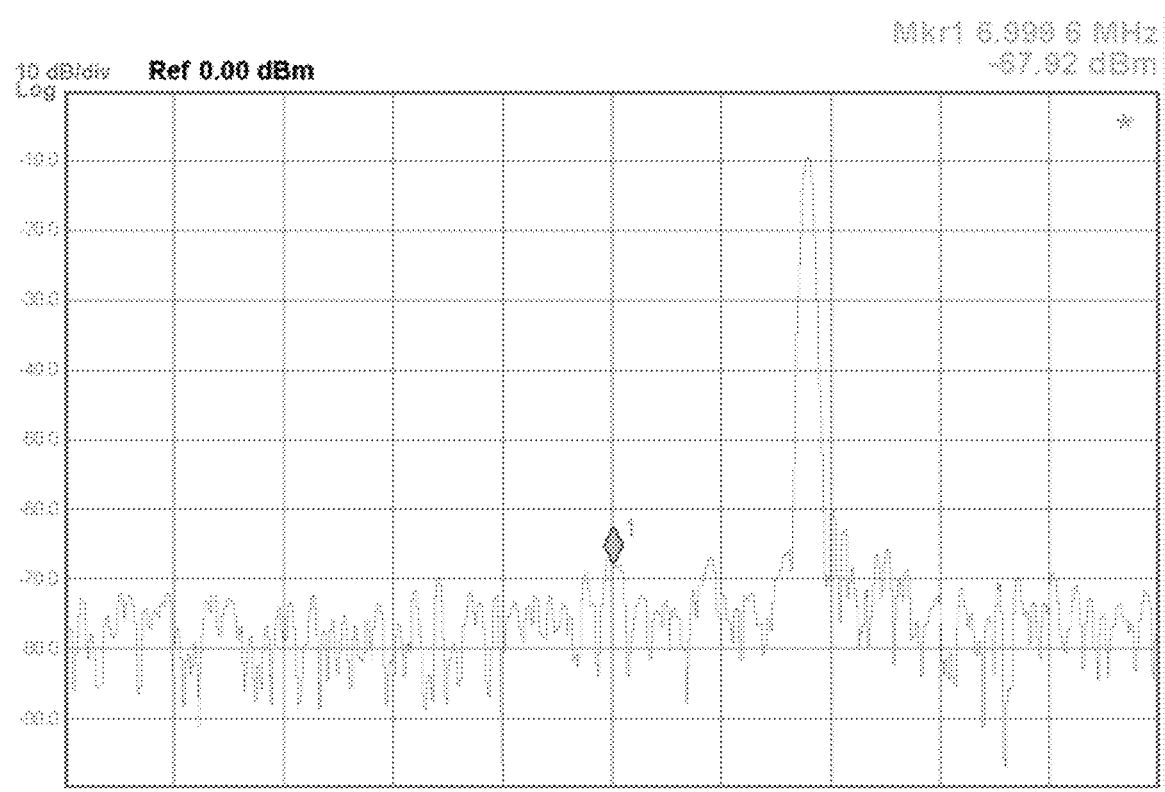
FIG. 7 is an amplitude curve of a periodic nonlinear signal.

Setting the target mirror to move at an uniform speed, and the test results of spectrum analyzer are shown in FIG. 6 and FIG. 7.

When the spectrum analyzer reads an interference signal amplitude of −9.40 dB and a nonlinear signal amplitude of −67.92 dB, the periodic nonlinear error is:

$$NPL = \frac{632.8}{2\pi \times 4} \cdot \frac{\Gamma_N}{\Gamma_S} \text{nm}$$
$$= \frac{632.8}{2\pi \times 4} \cdot 10^{\left(\frac{67.92-9.40}{20}\right)} \text{nm}$$
$$\approx 0.029 \text{ nm}$$

In summary, the periodic nonlinear error is 0.029 nm, and this heterodyne interferometric optical structure suppresses the traditional nanometer level periodic nonlinear error to the deep sub-nanometer level, which shows that it has an excellent capability to suppress periodic nonlinear error.

The above embodiments provide further detailed illustrations of the objective, technical solution, and advantageous effects of the present application. It should be understood that the above are only embodiments of the present application and are not intended to limit the scope of the present application. Any modifications, equivalent substitutions, improvements, etc. made based on the technical solution of the present application should be included in the scope of the present application.

What is claimed is:

1. A heterodyne interferometer based on multi-target opposite displacement measurement, comprising a laser source for providing two spatially separated beams with different frequencies; the two spatially separated beams with different frequencies are defined as a first input beam with frequency $f_1$ and a second input beam with frequency $f_2$, respectively;

an output path of the laser source is sequentially arranged with a first beam splitter (PBS1) and a second beam splitter (PBS2) arranged in parallel, and the second beam splitter (PBS2) is arranged on a right side of the first beam splitter (PBS1), and both of the first beam splitter (PBS1) and the second beam splitter (PBS2) are polarization beam splitters;

the first beam splitter (PBS1) is used to divide the two spatially separated beams into two reference beams and two measurement beams;

the second beam splitter (PBS2) is used to achieve that a relative displacement in optical path of an object opposing one or both of the two measurement beams, and the splitting direction of the second beam splitter (PBS2) is perpendicular to a splitting direction of the first beam splitter (PBS1);

a first reflector (FR1) is arranged above the first beam splitter (PBS1) in a reflected light emission direction of the first beam splitter (PBS1), a third reflector (FR2) is arranged on a right side of the second beam splitter (PBS2), a second plane reflector (M2) is arranged in front of the second beam splitter (PBS2) in a reflected light emission direction of the second beam splitter (PBS2), and a first plane reflector (M1) is arranged behind the second beam splitter (PBS2) in the reflected light emission direction of the second beam splitter (PBS2); the first plane reflector (M1) and the second plane reflector (M2) jointly constitute a second reflector group; a front end face of the second beam splitter (PBS2) is attached with a second quarter-wave plate (QWP2), and a rear end face is attached with a first quarter-wave plate (QWP1);

the first reflector (FR1) and the second reflector group are used for reflecting the two reference beams and the two measurement beams;

the third reflector (FR2) is used to achieve optical path layering;

a left side of the first beam splitter (PBS1) is provided with a first photodetector (PDm) and a second photodetector (PDr);

the first photodetector (PDm) and the second photodetector (PDr) are used to detect interference signals related to the two reference beams and the two measurement beams after reflection.

2. The heterodyne interferometer based on multi-target opposite displacement measurement according to claim 1, wherein the first reflector (FR1) and the third reflector (FR2) are retroreflector.

3. The heterodyne interferometer based on multi-target opposite displacement measurement according to claim 2, wherein a spatial position status of the first beam splitter (PBS1) and the second beam splitter (PBS2) satisfy that directions of reflected beams of the first beam splitter and the second beam splitter are perpendicular to each other.

4. The heterodyne interferometer based on multi-target opposite displacement measurement according to claim 3, wherein a motion direction of the second reflector group is perpendicular to the direction of an incident light of the second reflector group.

5. The heterodyne interferometer based on multi-target opposite displacement measurement according to claim 1, wherein the first plane reflector (M1) and the second plane reflector (M2) are both composed of a single moving large plane reflector, or both are composed of a plurality of moving small plane reflectors.

* * * * *